July 12, 1927. Re. 16,672

J. BERGSTEN

ELEVATOR

Original Filed Dec. 2, 1921

Inventor:
John Bergsten.
by W. H. Maxwell
his Attorney.

Reissued July 12, 1927. Re. 16,672

UNITED STATES PATENT OFFICE.

JOHN BERGSTEN, OF REDONDO, CALIFORNIA, ASSIGNOR, BY MESNE ASSIGNMENTS, TO STANDARD MACHINE COMPANY, A CORPORATION.

ELEVATOR.

Original No. 1,434,673, dated November 7, 1922, Serial No. 519,472, filed December 2, 1921. Application for reissue filed October 10, 1924. Serial No. 742,924.

This invention relates to elevators for raising and lowering rods, tubing, well casings, and the like.

An object of the present invention is the provision of a positive lock to hold the elevator in closed position, when a tool or other article is being raised or lowered.

A further object of the invention is the provision of means for retaining the elevator in open position to permit ready insertion of a tool or other article.

The locking mechanism is provided with operating means normally retained in locked position by means of a spring and adapted to be retained in open position when the elevator is opened against the tension of the spring.

It is another object of this invention to provide an elevator with a single means for holding it open and closed.

Another object of my invention is to provide an elevator which is automatically set in the open and closed positions and is freely operable between such positions.

A further object of this invention is to provide an elevator with a locking member adapted to project a substantial distance into the work receiving passage in the body and means whereby the locking member is held out of said passage when the elevator is open.

Another object is to provide certain practical and effective improvements in the formation and relationing of parts in an elevator.

A further object of this invention has been to provide an elevator locking pin of improved construction and operation.

The objects, features and advantages of my present invention will be best and more fully understood from consideration of the following specification when read with reference to the accompanying drawings, which specification and drawings set forth a typical form and embodiment of the invention, in which drawings—

Figures 1, 2:
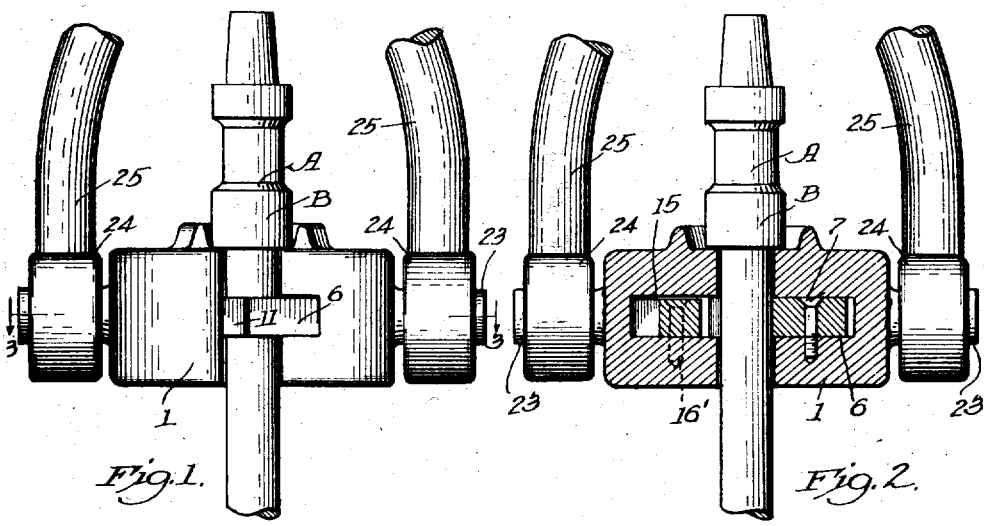
Fig. 1 is a front elevation.
Fig. 2 is a vertical sectional view.

The elevator includes two main parts hinged together or pivotally connected to releasably engage around a rod, a pipe, or the like. In the present case one part is in the form of a body 1, and the other is in the form of a closure or gripping member 6. The body has a vertical slot or passage 2, extending into it from its front side to receive the rod or pipe to be handled by the tool. The passage 2 extends inwardly to about the center of the body where its inner end is curved or rounded to correspond to the curvature of the rod or pipe. The passage 2 divides the front portion of the body so that the body is in the form of a U. A recess 3 extends laterally into the body from the passage at a point about midway between the top and bottom of the body. The recess has a portion 4 which extends to and is open at the rear of the body. In one side of the body the recess stops before reaching the front of the body leaving a wall 5.

The closure or gripping member 6 is pivotally mounted in the recess on a vertical pin 7 arranged in the recess. The member 6 has a cut out portion or recess 8 extending into it from one side and adapted to receive a rod or pipe arranged in the passage 2 of the body. The parts of the member 6 at the sides of the recess 8 form jaws 9 and 10.

Figure 3:
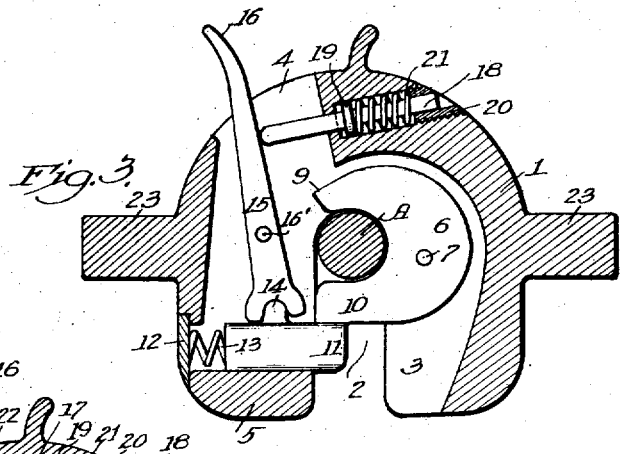
Fig. 3 is a horizontal sectional view on line 3—3 of Figure 1, showing the device in closed position, and, Fig. 4 is a similar view showing the device in open position.

A locking member 11 is provided for cooperation with the member 6 and is shown located at the inner side of the wall 5. I have shown the locking member in the form of a hollow pin arranged in an opening in the body. The locking member may be arranged in the opening from the exterior of the body. The pin carries a spring 13 which bears against a plate arranged to close the outer end of the opening in the body. The spring normally projects the locking member to the position shown in Fig. 3 of the drawings. The rear face of the locking member is provided with a lug 14 adapted to be received in a forked end of a lever 15 which is pivotally mounted in the recess 3 on a pin 16′. The rear end of this lever extends through the opening 4 and forms a handle 16.

At the rear of the body there is an opening 17 extending into the body and carrying a pin 18. The pin is provided with an enlargement 19 forming a plunger. A threaded plug 20 normally closes the opening and a spring 21 is arranged between the plug and plunger. The threaded plug is provided with a longitudinal opening for the reception of the rear end of the pin 18 forming a guide therefor. The other end of the pin projects through wall 22 of the recess in the body and engages the lever 15.

Suitable trunnions 23 may be arranged on each side of the body portion, and these trunnions are adapted to be received in bearings 24 formed on the lower ends of arms 25 of a bail or support which may be of the usual type.

Figure 4:
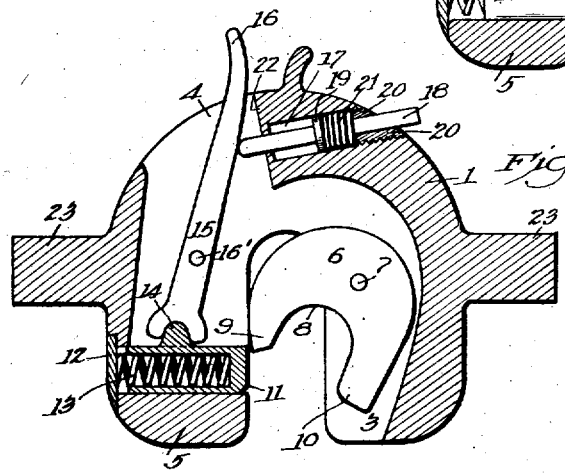

In operation, a rod, tubing, well casing or other object or piece of work A, when carried by the elevator is located in the inner part of the passage 2 and is supported by the elevator through a projection or flange B provided on the object A. The object or work A is held against lateral displacement from the passage 2 by the locking member 11 holding the closure member 6 in the position shown in Fig. 3. The body 1 and member 6 are so related that the jaw 10 of the member 6 extends across the passage in front of the work when the work is in position in the passage 2. The locking member projects a substantial distance over or in front of the jaw 10 to positively lock it in the closed position. When the work is to be removed from the elevator the locking member is retracted against the resistance of springs 13 and 21 by proper movement of the lever 15. As the work moves outwardly through the passage 2 it operates on the jaw 10 of the closure 6 to move the closure to a position such as is shown in Fig. 4. The locking member remains retracted or out of the passage while the work is being removed and engages the jaw 9 of the closure 6 to hold the closure in the open position when the work is out of the passage. The jaw 9 operates to hold the locking member retracted so that it does not project into the passage to interfere with passage of work into the elevator and the locking member operates to yieldingly hold the closure 6 in the open position ready to receive another piece of work. Work being arranged in the body 1 engages the jaw 9 to release it from the locking member and to move it inwardly so that the closure automatically moves to the closed position where it is automatically locked by the member 11.

The pin 18, bearing against the lever 16 also places the spring 21 under tension when the device is in open position and insures proper closing of the locking member when desired.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having described my invention, I claim:

1. An elevator comprising a body portion having a vertical passage and a lateral recess, a gripping member pivotally mounted in said recess, said gripping member being provided with a cut-out portion adapted to aline with said passage, and a locking device comprising a laterally movable bar adapted to retain said member in open or closed position.

2. An elevator comprising a body portion having a vertical passage and a lateral recess, a gripping member pivotally mounted therein, said gripping member being provided with a cut-out portion, a locking device comprising a laterally movable bar adapted to retain said gripping member in open or closed position, and a spring to retain said bar in operative position.

3. An elevator comprising a body portion having a vertical passage and a lateral recess, a gripping member pivotally mounted in the recess, said gripping member being provided with a recessed portion, a spring pressed locking member mounted in the body and normally engaging said gripping member to retain it in either of two positions, and a pivoted lever engaging said locking member.

4. An elevator comprising a body portion having a vertical passage and a lateral recess, a gripping member pivotally mounted in the recess, said gripping member being provided with a recessed portion, a spring pressed locking member mounted in the body and normally engaging said gripping member to retain it in either of two positions, a pivoted lever engaging said locking member, and a spring pressed pin engaging said lever to normally maintain said locking member in operative position.

5. An elevator including, two work holding parts connected for one to swing horizontally with relation to the other between a closed position and an open position, and a single spring actuated member for holding the parts against relative movement when in said positions.

6. An elevator including, two work holding parts connected for one to swing horizontally with relation to the other between a position where the parts are open and a position where the parts are closed, means whereby the parts are automatically closed upon application of work thereto, and means other than the frictional resistance of the connection between the parts for holding the parts in both the open and closed positions.

7. An elevator including, two work holding parts connected for one to swing horizontally with relation to the other between a closed position and an open position, and means for holding the parts against relative movement when in said positions, said parts and means being related so that the parts are free of said means while moving between said positions.

8. An elevator including, two work holding parts pivotally connected for one, to swing with relation to the other between a position where said parts are open and a position where said parts are closed, said part having two jaws, one whereby it is automatically moved to a position where the parts are closed upon application of work to the parts and another whereby it is automatically moved to a position where the parts are open upon removal of work from the parts, and a member cooperating with one jaw to hold said part closed and cooperating with the other jaw to hold said part open.

9. An elevator including, two work holding parts pivotally connected for one to swing with relation to the other between a position where the parts are open and a position where the parts are closed, a spring actuated member operable to hold said parts against relative movement, a control lever for said member, and a spring in connection with the lever normally holding it in position where said member is in operating position.

10. An elevator including, a body having a work receiving opening, a closure adapted to retain work in the opening, a locking member for the closure normally projecting into the opening, and means whereby the locking member is held out of the opening when the closure is open.

11. An elevator including, a body having a work receiving opening, a closure adapted to retain work in the opening, a locking member for the closure normally projecting into the opening, and a part on the closure operating to hold the locking member out of the opening when the closure is open.

12. An elevator including, two work holding parts connected for one to swing with relation to the other between a position where the parts are open and a position where the parts are closed, and a single spring actuated member operable to positively hold the parts in the closed position and to yieldingly hold the parts in the open position.

13. An elevator including, two work holding parts connected for one to swing horizontally with relation to the other between a position where the parts are open and a position where the parts are closed, means whereby the parts are automatically closed upon application of work thereto, and means operating to automatically positively lock the parts in closed position when moved thereto and to hold them in open position when moved thereto.

14. An elevator comprising a body having a vertical passage and a lateral recess, a member pivotally mounted in the recess having a recessed portion cooperating with the passage of the body, and a spring actuated locking member normally engaging said gripping member to retain it in either of two positions.

JOHN BERGSTEN.